United States Patent [19]

Prigge

[11] 4,206,741
[45] Jun. 10, 1980

[54] OUTDOOR GRILL

[76] Inventor: James D. Prigge, 8436 N. 37th Ave., Phoenix, Ariz. 85021

[21] Appl. No.: 903,943

[22] Filed: May 8, 1978

[51] Int. Cl.² ............................................. F24B 3/00
[52] U.S. Cl. .................................................. 126/25 A
[58] Field of Search ............ 126/25 R, 25 A, 25 AA; 99/443, 393; 248/407, 161; 16/114 A

[56] References Cited

U.S. PATENT DOCUMENTS

| | | | |
|---|---|---|---|
| 545,438 | 9/1895 | Allen ..................................... | 248/407 |
| 750,742 | 1/1904 | Weston ............................. | 126/299 C |
| 1,022,978 | 4/1912 | Stevenson ........................... | 16/114 A |
| 2,501,940 | 3/1950 | Hibbard .............................. | 16/114 A |
| 3,176,676 | 4/1965 | Caldwell ............................. | 126/25 A |
| 3,276,440 | 10/1966 | Sazegar ............................... | 126/25 A |
| 3,526,217 | 9/1970 | Garske et al. ...................... | 126/25 A |
| 3,593,701 | 7/1971 | Youmans ............................ | 126/25 A |

*Primary Examiner*—Carroll B. Dority, Jr.
*Attorney, Agent, or Firm*—Harry M. Weiss

[57] ABSTRACT

A grill assembly having separable parts selectably useable together for different arrangements. The assembly includes a column, a base, a grid, a handle and a fire pan. The grid and column may be used without use of the other parts.

8 Claims, 4 Drawing Figures

OUTDOOR GRILL

BACKGROUND OF THE INVENTION

1. Field of the Invention

This invention relates to outdoor grills, and more particularly, to an outdoor grill of the portable type.

2. Description of the Prior Art

Many outdoor grills of many types have been previously provided. In general, none have been provided which are readily useable with or without a fire pan. For example, in cooking arrangement as shown in U.S. Pat. No. 750,742 there is no provision for a fire pan for containing heat source if such should be desired. On the other hand, an arrangement as shown in U.S. Pat. No. 3,526,217 has no provision for use without the fire pan.

SUMMARY OF THE INVENTION

Accordingly, it is an object of this invention to provide an outdoor grill which may be used in many arrangements.

It is a further object of this invention to provide an outdoor grill which may be used with or without a fire pan.

A still further object of this invention is to provide an outdoor grill which may be economically and readily manufactured.

In accordance with these objects there is provided an outdoor grill assembly which can be readily packaged together. Included in the package is a support column, a support base, a fire pan, a grid, and a handle. Each of the foregoing members have cooperating interconnecting parts for securing the members together in a selectable arrangement.

In accordance with the further objects of this invention there is provided an outdoor grill which has a column with support members spaced periodically along its length, and a grid having a hub member at its center. The hub member encircles said column and is adapted to engage said support members to secure said grill at selectable points along the length of the column.

Also provided is a tripod support base connected with the lower portion of said column. A spike portion of the column extends there through for insertion into the ground.

The hub is a cylinder having generally closed ends with each end having a keyhole slot therein, and the support members are teeth extending outwardly from the column. Either end of the hub may engage the teeth to provide different heights for the grill. The hub has a handle secured thereto extending upwardly and outwardly therefrom for manipulation of the grid relative to the column.

BRIEF DESCRIPTION OF THE DRAWING

Further objects and advantages of the invention will be understood from the following complete description thereof and from the drawings wherein.

COMPLETE DESCRIPTION

As noted above, many outdoor grills of many types have been previously provided. In general, none have been provided which are readily useable with or without a fire pan. For example, in cooking arrangement as shown in U.S. Pat. No. 750,742 there is no provision for a fire pan for containing heat source if such should be desired. On the other hand, an arrangement as shown in U.S. Pat. No. 3,526,217 has no provision for use without the fire pan.

Figure 1:
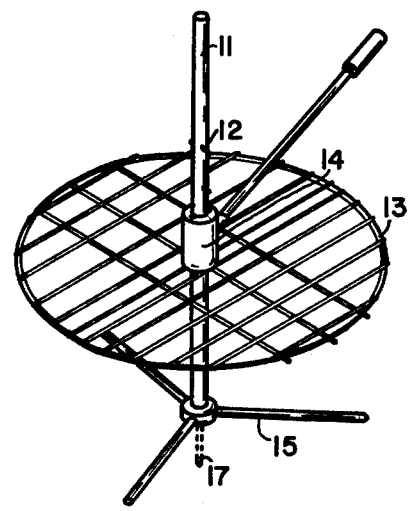
FIG. 1 is a perspective view of an outdoor grill in accordance with the invention.
Figure 2:
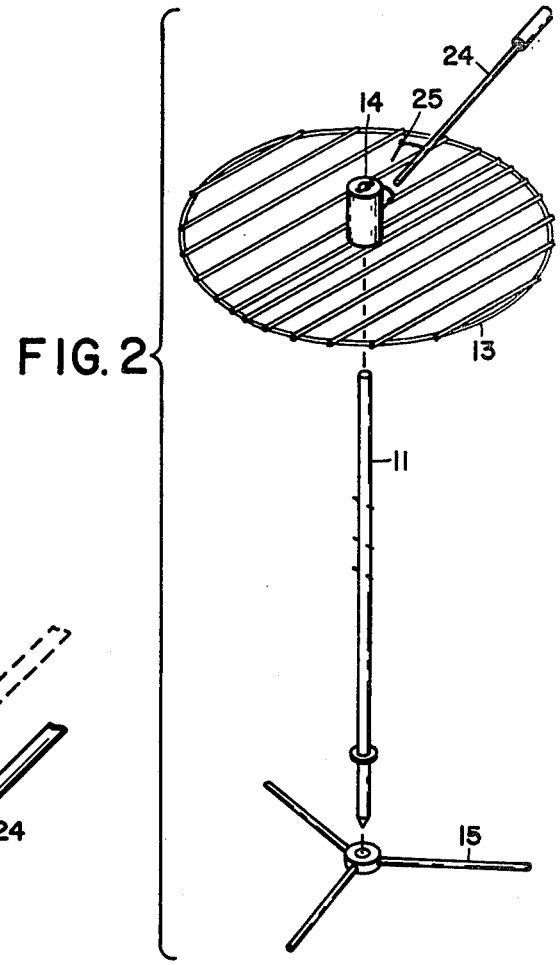
FIG. 2 is an exploded view.

In accordance herewith, it will be seen in FIG. 1 that there is an outdoor grill including a column 11 having support members 12 spaced periodically along its length. A grid 13 has a hub member 14 at its center, which hub member 14 encircles said column 11. The hub member 14 is adapted to engage said support member 11 to secure the grid 12 at selectable points along the length of the column 10. The outdoor grill further includes a tripod support base 15 engaging with the lower portion of the column 11. A pointed extension 17 of the column 10 extends therethrough for insertion into the ground.

The hub 14 is a cylinder 18 having generally closed ends 19 and 20. Each end 19 and 20 have a keyhole slot 21 and 22 therein. The support members 12 are teeth 23 extending outwardly from the column 11.

Figure 3:
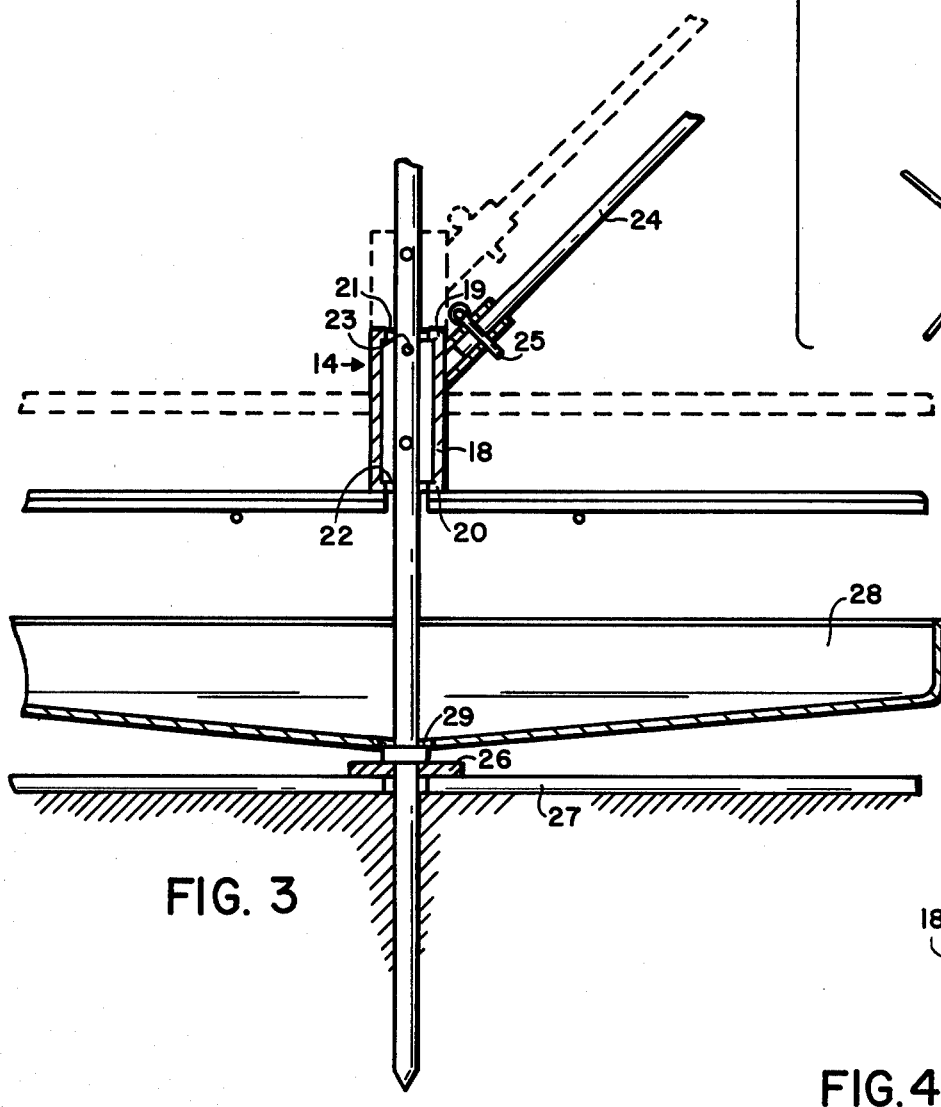
FIG. 3 is a cross-sectional view of a further embodiment.
Figure 4:
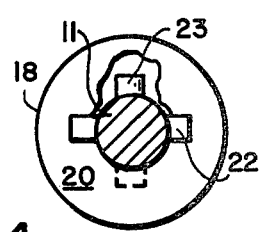
FIG. 4 is an enlarged detail of a portion thereof.

The length of the cylinder 18 is greater than the spacing of the teeth 23 whereby either end 19 or 20 of the hub 14 may provide different heights for the grid 13. An adjusted position is shown in phantom in FIG. 3. The bottom portion of each end 19 and 20 which functions as a slotted washer has a recess preferably transverse to the slots 21 and 22 in order to provide a stop for the support members 12 or teeth 23 to prevent spinning during use.

The hub 14 has a handle 24 secured thereto extending upwardly and outwardly therefrom with the handle secured to said hub 14 by a removable pin 25.

The tripod base 15 is manufactured of a ring 26 surrounding said column 11 and three rods 27 extending horizontally therefrom and secured equidistantly thereabout.

A fire pan 28 can be supported intermediate the base 15 and the grid 13 about said column either by the ring 26 or the supporting teeth 23. The fire pan 28 has a keyhole slot 29 in the center thereof so that it may be slid onto the column.

Thus, for convenience of single packaging the outdoor grill assembly includes the support column 11, the support base 15, the fire pan 28, the grid 13 and the handle 24, each of said members having cooperating interconnecting members for securing said members together in a selectable arrangement.

It will thus be seen that this invention provides an outdoor grill which may be used in many arrangements with or without a fire pan and may be economically and readily manufactured.

While the invention has been particularly shown and described in reference to the preferred embodiment thereof, it will be understood by those skilled in the art that suitable modification may be made therein without departing from the spirit and scope of the invention. For example, with an already existing fire, the column may be inserted directly into or adjacent the fire, or the tripot base may be placed in the fire and the column inserted through the ring thereof. Then, the entire assembly can be connected up to provide a quick way of assembling an outdoor grill even onto an existing fire.

What is claimed is:

1. An outdoor grill comprising a column having support members in the form of outwardly extending teeth spaced periodically along said column, a grid having a hub member at its center, which hub member encircles said column and is adapted to engage said support members to secure said grill at selectable points along the length of the column, and a tripod support base engaging a lower portion of said column, a pointed extension of said column extending therethrough for insertion into the ground.

2. An outdoor grill comprising a column having support members spaced periodically along its length, and a grid having a hub member at its center, which hub member encircles said column and is adapted to engage said support members to secure said grill at selectable points along the length of the column, wherein said hub is a cylinder having generally closed ends, each end having a keyhole slot therein, and the support members are teeth extending outward from the column.

3. An outdoor grill as recited in claim 2 wherein the length of the cylinder is greater than the spacing of the teeth whereby either end of the hub may provide different heights for the grill.

4. An outdoor grill as recited in claim 2 wherein said hub has a handle secured thereto extending upwardly and outwardly therefrom.

5. An outdoor grill as recited in claim 4 wherein said handle is secured to said hub by a removable pin.

6. An outdoor grill as recited in claim 1 wherein said tripod base comprises a ring surrounding said column and three rods extending horizontally therefrom and secured equidistantly thereabout.

7. An outdoor grill as recited in claim 2 and including a fire pan supported intermediate said base and said grid about said column.

8. An outdoor grill as recited in claim 7 wherein said fire pan has a keyhole slot in the center thereof.

* * * * *